United States Patent
Simozato

[11] Patent Number: 6,064,534
[45] Date of Patent: May 16, 2000

[54] METHOD AND APPARATUS FOR VARYING WRITE CURRENTS SUPPLIED TO RECORDING HEADS BASED ON TEMPERATURE CHANGES IN AN INFORMATION STORING DEVICE

[75] Inventor: Toru Simozato, Kawasaki, Japan

[73] Assignee: Fujitsu Limited, Kawasaki, Japan

[21] Appl. No.: 08/991,834

[22] Filed: Dec. 16, 1997

[30] Foreign Application Priority Data

Jun. 10, 1997 [JP] Japan ..................... 9-152680

[51] Int. Cl.⁷ ........................................... G11B 5/09
[52] U.S. Cl. ............................................... 360/46
[58] Field of Search .................... 360/46, 69, 97.02, 360/68

[56] References Cited

U.S. PATENT DOCUMENTS 5,408,365  4/1995  Van Doorn et al. .................. 360/46
5,455,717  10/1995 Van Doorn et al. .................. 360/6

FOREIGN PATENT DOCUMENTS

| | | |
|---|---|---|
| 60-143404 | 7/1985 | Japan . |
| 63-167404 | 7/1988 | Japan . |
| 1-33703 | 2/1989 | Japan . |
| 1-245406 | 9/1989 | Japan . |
| 1-317208 | 12/1989 | Japan . |
| 2-304702 | 12/1990 | Japan . |
| 4-14604 | 1/1992 | Japan . |
| 9-7106 | 1/1997 | Japan . |

*Primary Examiner*—W. Chris Kim
*Attorney, Agent, or Firm*—Greer, Burns & Crain, Ltd.

[57] ABSTRACT

An optimum write current, which is supplied to a recording head when the recording head is used for recording information onto a recording medium, is set. An ambient temperature is set. A plurality of write currents are set in the set ambient temperature. A signal is written onto the recording medium with the set plurality of write currents and a demodulation margin is detected for each write current of the plurality of write currents. An optimum write current is determined from the plurality of write currents for the ambient temperature based on the demodulation margins detected for the respective write currents. The above-mentioned operations are performed for each of a plurality of ambient temperatures, and an optimum write current is obtained for each ambient temperature of the plurality of ambient temperatures.

17 Claims, 14 Drawing Sheets

FIG. 4A

| TEMPERATURE | HEAD 103-1 WRITE CURRENT Iw1 | | HEAD 103-n WRITE CURRENT Iwn |
|---|---|---|---|
| T1 | Iw 1-1 | ......... | Iw n-1 |
| ⋮ | ⋮ | | ⋮ |
| Tℓ | Iw 1-ℓ | | Iw n-ℓ |

FIG. 4B
Ta 1

| HEAD No. | REFERENCE WRITE CURRENT |
|---|---|
| HEAD 1 | IS 1 |
| HEAD 2 | IS 2 |
| ⋮ | ⋮ |
| HEAD n | IS n |

FIG. 4C
Ta 2

| TEMPERATURE | HEAD No.1 CORRECTING AMOUNT | | HEAD No.n CORRECTING AMOUNT |
|---|---|---|---|
| T1 | ΔI 1-1 | | ΔI n-1 |
| T2 | ΔI 1-2 | | ΔI n-2 |
| ⋮ | ⋮ | ... | ⋮ |
| TL | ΔI 1-L | | ΔI n-L |
| ⋮ | ⋮ | ... | ⋮ |
| Tℓ | ΔI 1-ℓ | | ΔI n-ℓ |

FIG. 4D
Ta 3

| HEAD No. | REFERENCE WRITE CURRENT |
|---|---|
| HEAD 1 | Iw 1-L |
| HEAD 2 | Iw 2-L |
| ⋮ | ⋮ |
| HEAD n | Iw n-L |

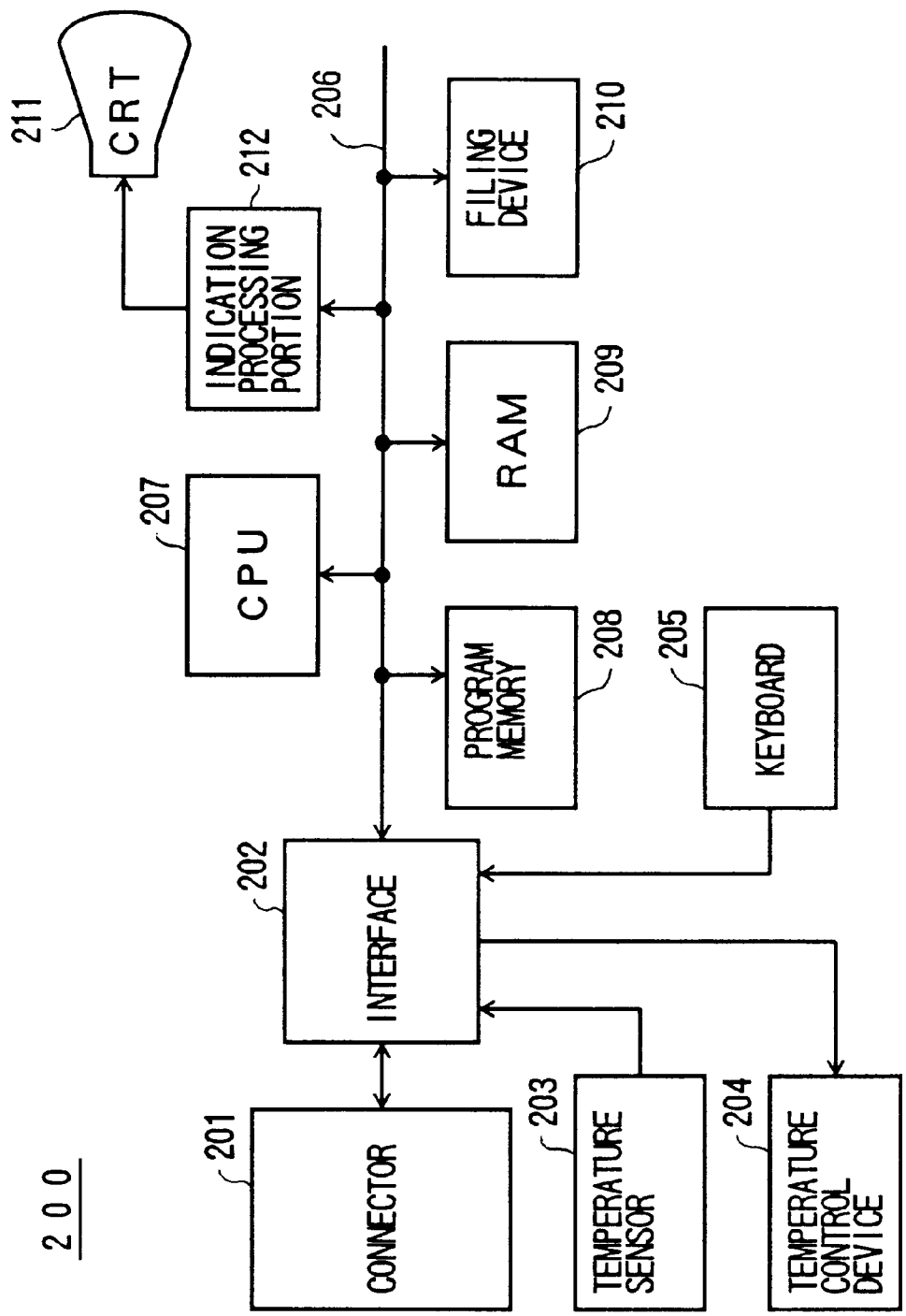

F I G. 8A
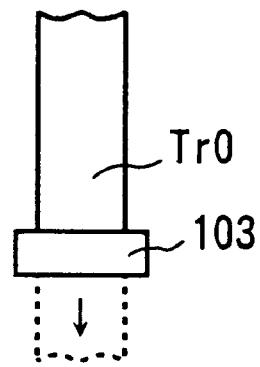
F I G. 8B
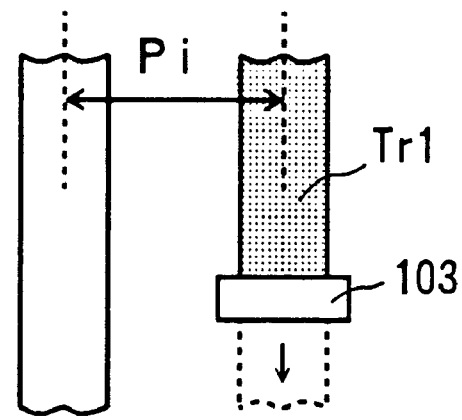
F I G. 8C
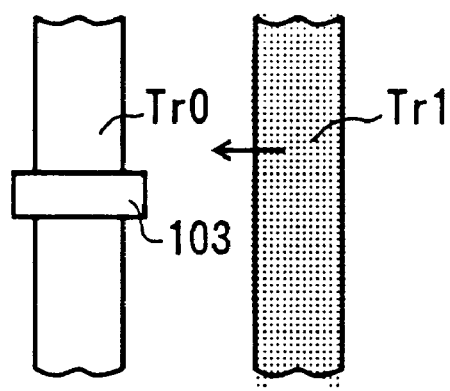

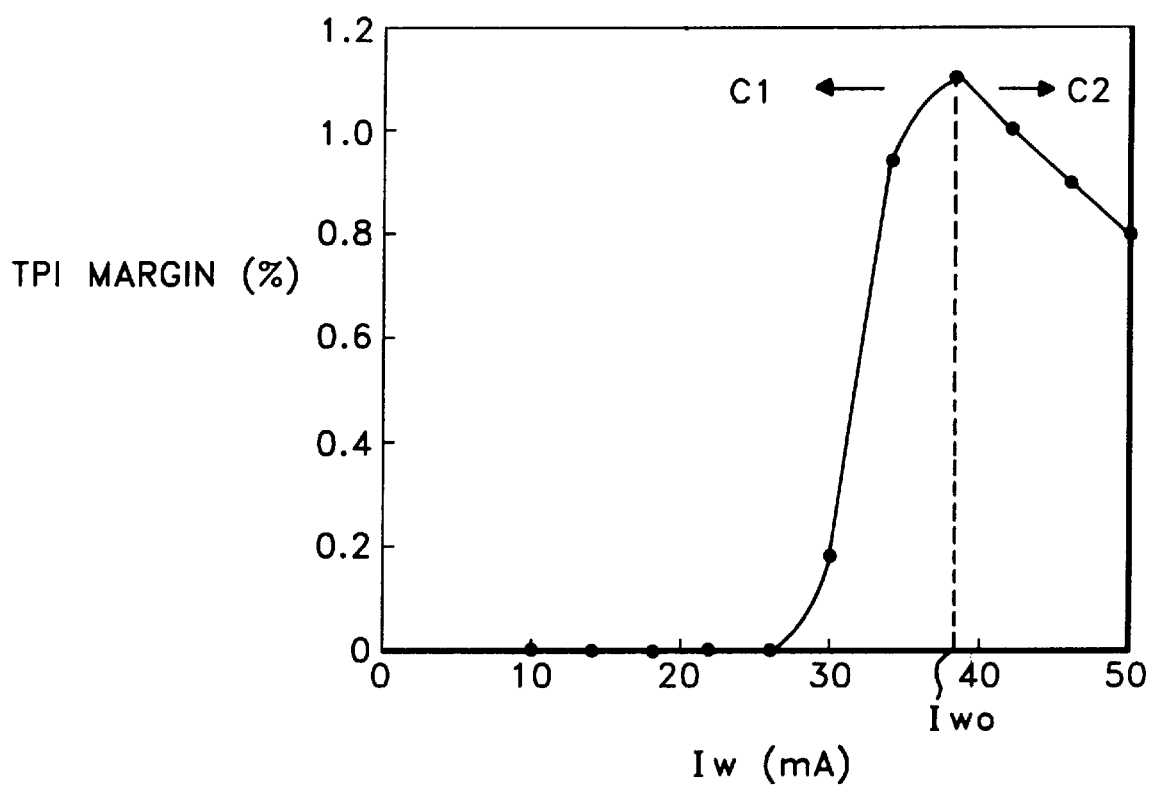

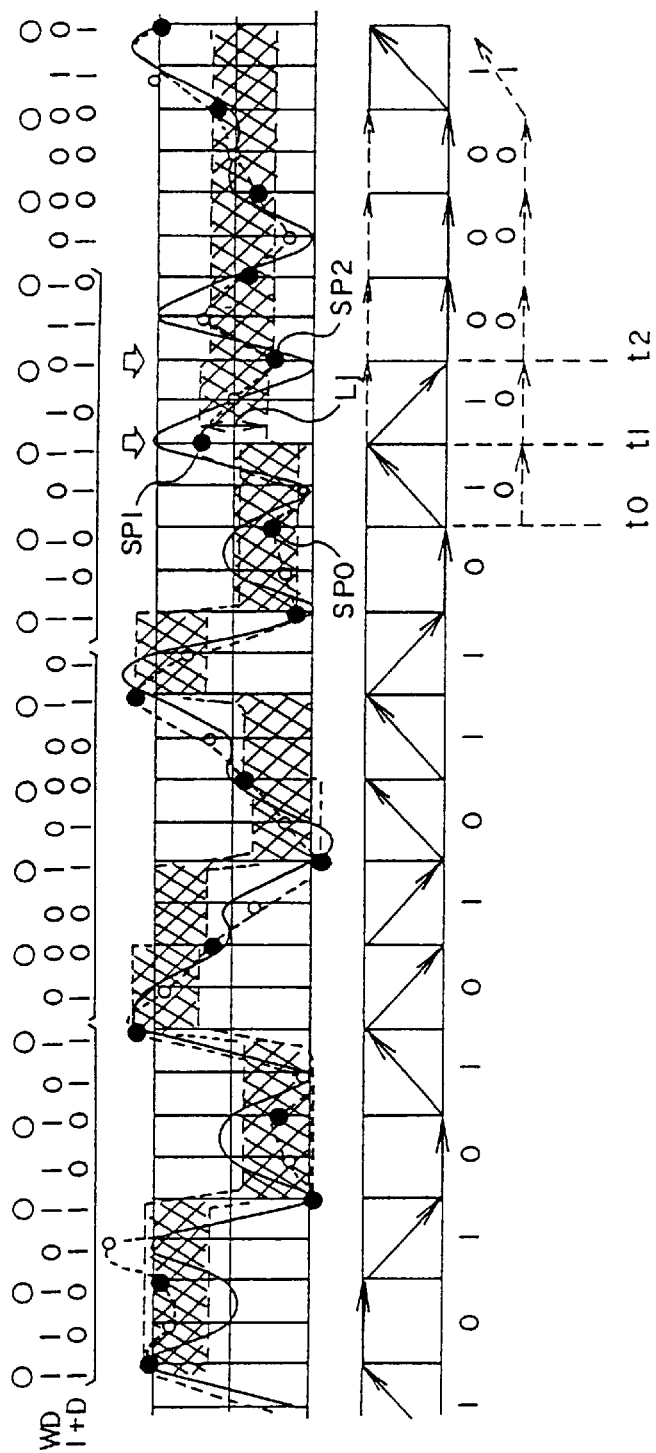

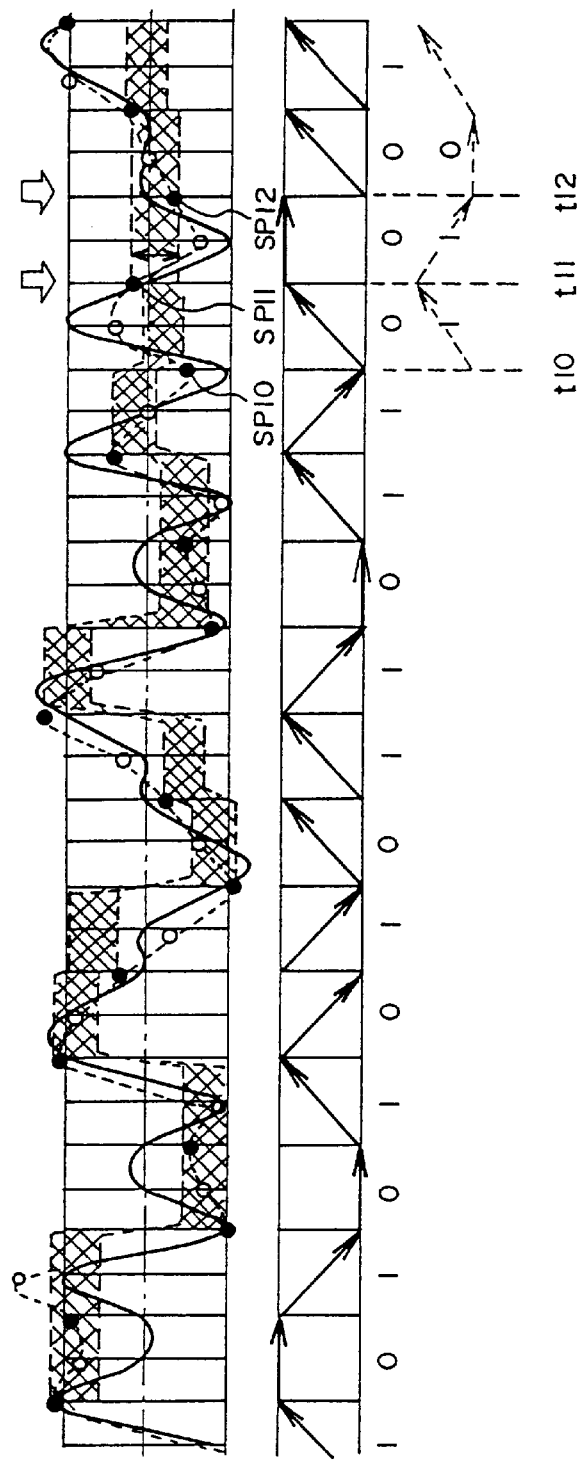

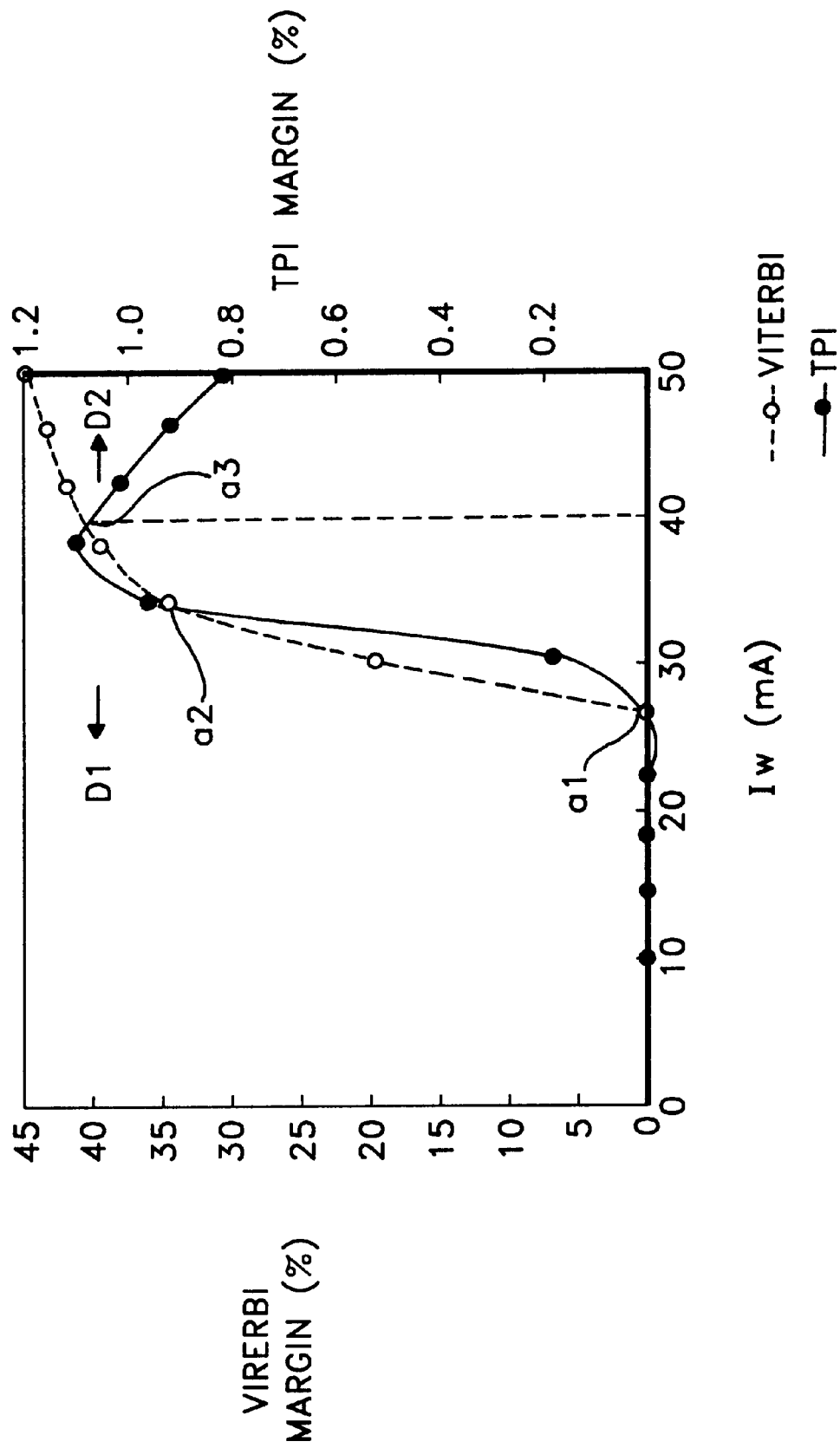

METHOD AND APPARATUS FOR VARYING WRITE CURRENTS SUPPLIED TO RECORDING HEADS BASED ON TEMPERATURE CHANGES IN AN INFORMATION STORING DEVICE

BACKGROUND OF THE INVENTION

1. Field of the Invention

The present invention relates to a write current setting method, and, in particular, to a write current setting method and a write current setting apparatus for setting an optimum write current for an information storing device in which the characteristics of a write head change in accordance with the temperature. The present invention also relates to the information storing device.

Recently, miniaturization and larger capacity are required for an external information storing device. For this purpose, increasing the information storing density and increasing the information transfer speed are required for a magnetic disk device.

In the magnetic disk device, to increase the information storing density, the track width on the magnetic disk is greatly narrowed. As a result of the track width being narrowed, crosstalk between adjacent tracks becomes a problem.

Further, in order to increase information transfer speed, the write frequency is increased. Thereby, magnetization of the magnetic disk is insufficient. As a result, when new information is overwritten onto the magnetic disk, it is likely that old information still remains on the magnetic disk. In addition, the overwrite capability is degraded when crosstalk is reduced, and crosstalk increases when the overwrite capability is improved. It is necessary to set a write current such that the balance between a reduction of crosstalk and an improvement of write capability is optimum when the write current is used.

2. Description of the Related Art

FIG. 1 shows a plan view of an example of a magnetic disk device in the related art. In the magnetic disk device 11 shown in FIG. 1, an actuator 12 is provided with arms 13. A supporting spring mechanism 13a is provided to the extending end of each arm 13. Each arm 13 is provided with a magnetic head 14 at the extending end thereof. A base portion of the arms 13 is rotatably supported by a pivot 15. The arms 13 are positioned between adjacent ones of a plurality of magnetic disks 20 which will be described later.

A coil supporting portion 16 is provided at the side opposite to the arm 13 with respect to the pivot 15. A coil 17 is wound on the coil supporting portion 16. Two magnets 18a and 18b are fixed below the coil 17. The coil 17 and magnets 18a, 18b form a VCM (Voice Coil Motor).

In the magnetic disk device 11, the plurality of magnetic disks 20 are fixed to a spindle motor and are rotated by the spindle motor. The arm 13 is rotated as a result of a current being supplied to the coil 17 from a wiring board 21 via a flexible printed board 22. Thereby, with respect to these magnetic disks 20, the arms 13 are rotated so that each magnetic head 14 moves in a radial direction of the magnetic disks 20.

As each magnetic head 14, a thin-film head is used, and the magnetic heads 14 float by a predetermined amount due to the rotation of the magnetic disks 20, respectively. Each thin-film magnetic head 14 includes a write head formed as a result of forming a coil and a magnetic gap in a thin-film formation technique, and is formed on a slider. Each thin-film magnetic head 14 further includes a read head using a magneto-resistive device and is also formed on the slider. A predetermined current (write current) is supplied to the coil of the write head. Thereby, writing data to the respective magnetic disk 20 is performed through leakage magnetic flux occurring from converting electricity to magnetic flux. The data written on the magnetic disk is read through the read head and a waveform corresponding to the write current (amplitude of a read current) is obtained.

In the above-described magnetic disk device, because of increase of the information storing density, the track width on each magnetic disk 20 is greatly narrowed. As a result of the track width being narrowed, crosstalk between adjacent tracks becomes a problem. Further, in order to increase the information storing density and to increase information transfer speed, the write frequency is increased. As a result, when new information is overwritten onto the magnetic disk 20, it is likely that old information still remains on the magnetic disk 20. Thus, problematically, the overwrite capability is degraded.

As mentioned above, the overwrite capability is degraded when crosstalk is reduced, and crosstalk increases when the overwrite capability is improved. Therefore, it is necessary to set the write current carefully.

Further, the intensity of magnetization of the magnetic disk changes when the ambient temperature changes. Accordingly, it is necessary to change the write current so that both the crosstalk reduction and the overwrite capability improvement are at adequate levels for each temperature.

Characteristics of a magnetic disk device will be described.

FIGS. 2A, 2B and 2C show various characteristics of the magnetic disk device. FIG. 2A shows characteristics of crosstalk with respect to overwrite (O/W) gains. FIG. 2B shows characteristics of overwrite (O/W) gains with respect to temperatures. FIG. 2C shows characteristics of overwrite (O/W) gains with respect to write currents.

In the magnetic disk device having the characteristics shown in FIGS. 2A, 2B and 2C, as shown in FIG. 2A, in order to make crosstalk be on the order of −30 dB, it is necessary to controls the overwrite (O/W) gain to on the order of −30 dB.

Further, as shown in FIG. 2B, by changing the write current Iw, from 35 mA, to 30 mA, and to 25 mA, in response to rise of the temperature, it is possible to maintain the overwrite (O/W) gain to −30 dB.

Further, as shown in FIG. 2C, the overwrite (O/W) characteristics with respect to the write current Iw vary among magnetic heads 14-1, 14-2, 14-3 and 14-4, one of which is mounted to the magnetic disk device. Accordingly, by differently controlling the write current Iw for particular heads 14-1, 14-2, 14-3 and 14-4, it is possible to maintain the overwrite (O/W) gain to −30 dB.

Japanese Laid-Open Patent Application Nos. 63-167404, 1-245406 and 1-317208 proposed methods for setting the write current in accordance with the temperature in magnetic disk devices.

In these arts, a temperature sensor and a table in which the optimum write currents are set for particular temperatures are provided inside a magnetic disk device. Thereby, the write current is controlled in accordance with the detected temperature of the temperature sensor. Thus, information can be written in a disk independent of the temperature. In these arts, the overwrite characteristics are measured and the optimum write currents are set.

However, in the write current setting methods for magnetic disk devices in the related art, the overwrite characteristics themselves are measured. When the overwrite characteristics are measured, it is necessary to directly measure the state of the magnetic disk. Therefore, the measurement cannot be performed after the magnetic disk device has been assembled. Further, a considerable time is required for the measurement.

SUMMARY OF THE INVENTION

The present invention has been devised in consideration of the above-mentioned problems. An object of the present invention is to provide a write current setting method, write current setting apparatus and information storing device, in which it is possible to very easily set a write current which is optimum for the temperature.

A write current setting method, according to the present invention, for setting an optimum write current which is supplied to a recording head when the recording head is used for recording information onto a recording medium, comprises the steps of:

a) setting an ambient temperature;

b) setting a plurality of write currents in the ambient temperature set in the step a);

c) writing a signal on the recording medium with the plurality of write currents set in the step b) and detecting a demodulation margin for each write current of the plurality of write currents;

d) determining an optimum write current from the plurality of write currents for the ambient temperature based on the demodulation margins detected in the step c) for the respective write currents; and e) performing the steps a), b), c) and d) for a plurality of ambient temperatures, and obtaining an optimum write current for each ambient temperature of the plurality of ambient temperatures.

It may be that the demodulation margin detected in the step c) comprises a recording density margin based on information recording densities.

It may be that the demodulation margin detected in the step c) comprises a viterbi margin based on viterbi demodulation level ranges.

It may be that:

the step c) detects a plurality of kinds of demodulation margins; and the step d) determines the optimum write current based on the plurality of kinds of demodulation margins.

A write current setting apparatus, according to the present invention, connected to an information storing device which comprises a recording head for recording information onto a recording medium, temperature detecting means for detecting the temperature of the device and write current changing means for changing a write current to be supplied to the recording head in accordance with change of the temperature detected by the temperature detecting means, the apparatus setting the write currents which are used by the write current changing means of the device, comprises:

temperature setting means for setting an ambient temperature of the device;

write current setting means for setting a plurality of write currents in the ambient temperature set by the temperature setting means;

demodulation margin detecting means for writing a signal with the plurality of write currents set by the write current setting means and detecting a demodulation margin for each write current of the plurality of write currents;

optimum write current determining means for determining an optimum write current from the plurality of write currents for the ambient temperature based on the demodulation margins detected by the demodulation margin detecting means for the respective write currents; and optimum write current setting means for obtaining an optimum write current for each ambient temperature of the plurality of ambient temperatures set by said temperature setting means.

It may be that the demodulation margin detected by the demodulation margin detecting means comprises a recording density margin based on information recording densities.

It may be that the demodulation margin detected by the demodulation margin detecting means comprises a viterbi margin based on viterbi demodulation level ranges.

It may be that, in the information storing device, the recording track density is equal to or more than 5000 TPI (Track Per Inch).

It may be that:

the demodulation margin detecting means detects a plurality of kinds of demodulation margins; and the optimum write current determining means determines the optimum write current based on the plurality of kinds of demodulation margins.

An information storing device, according to the present invention, comprises a recording head for recording information onto a recording medium, temperature detecting means for detecting the temperature of the device and write current changing means for changing a write current to be supplied to the recording head in accordance with change of the temperature detected by the temperature detecting means, the write current changing means comprising:

a memory for storing an optimum write current for each temperature, the optimum write current for each temperature being obtained as a result of setting a plurality of temperatures of the device, setting a plurality of write currents for each temperature of the plurality of temperatures, writing a signal onto the recording medium with the plurality of write currents, detecting a demodulation margin for each write current of the plurality of write currents, determining the optimum write current from among the plurality of write currents, for each temperature of the plurality of temperatures of the device, based on the demodulation margins detected for the plurality of write currents, respectively; and recording control means for referring to the memory using the temperature detected by the temperature detecting means, reading the optimum write current for the detected temperature and supplying the read optimum write current to the recording head.

It may be that the optimum write currents stored in the memory are determined based on recording density margins, as the demodulation margins, based on information recording densities.

It may be that the optimum write currents stored in the memory are determined based on viterbi margins, as the demodulation margins, based on viterbi demodulation level ranges.

It may be that the optimum write currents stored in the memory are determined based a plurality of kinds of demodulation margins.

It may be that the density of track pits formed by the recording head onto the recording medium is equal to or more than 5000 TPI (Track Per Inch).

It may be that the recording control means changes discretely the optimum write current within a predetermined operation guarantee range.

It may be that the operation can be guaranteed in a predetermined temperature range from 0° through 60°.

It may be that:

the recording head comprises a plurality of recording heads; and the recording control means sets the optimum write current for each of the plurality of recording heads.

The information storing device may further comprise write current updating means for updating the optimum write current set in the memory at a desired timing for the temperature of the device detected by the temperature detecting means.

By determining the optimum write current based on the demodulation margins, the optimum write current can be easily set. Further, the optimum write current for each temperature is obtained. Thereby, the optimum write current can be provided even when the temperature changes. Thus, a stable reproduction signal can be obtained.

By obtaining the optimum write current based on the recording density margins, it is possible that the optimum write current is obtained for each temperature.

By obtaining the optimum write current based on the viterbi margins, demodulation can be surely performed even when the temperature changes.

By obtaining the optimum write current based on the plurality of kinds of demodulation margins, the optimum write current fulfilling a plurality of conditions can be obtained for each temperature. Thereby, information can be surely reproduced.

By setting the write current to be optimum for the track density equal to or more than 5000 TPI (Track Per Inch), high-density information recording can be performed.

By discretely changing the optimum write current within the predetermined operation guarantee temperature range, it is possible to always set the optimum write current within the predetermined operation guarantee temperature range.

By discretely changing the optimum write current within the predetermined operation guarantee temperature range from 0° C. through 60° C., it is possible to always set the optimum write current within the predetermined operation guarantee temperature range from 0° C. through 60° C.

By setting the optimum write current for each head of the plurality of heads, even for the device having a plurality of heads such as a hard disk device, the optimum write current can be set for each head of the plurality of heads.

By updating the optimum write current at a desired timing for the temperature of the device, it is possible to write information onto the recording medium in the optimum condition.

Other objects and further features of the present invention will become more apparent from the following detailed description when read in conjunction with the accompanying drawings.

BRIEF DESCRIPTION OF THE DRAWINGS

FIGS. 4A, 4B, 4C and 4D show data arrangements of an EEPROM in the first and second embodiments of the present invention;

FIG. 5 shows a block diagram of a measuring apparatus in the first and second embodiments of the present invention;

FIGS. 8A, 8B and 8C illustrate operations of the TPI margin detection in the first embodiment of the present invention;

FIG. 9 shows characteristics of TPI margins with respect to write currents in the first embodiment of the present invention;

FIGS. 12A–12E and 13A–13D illustrate operations of the viterbi margin detection in the second embodiment of the present invention; and FIG. 14 shows characteristics of TPI margins and viterbi margins with respect to write currents in the second embodiment of the present invention.

DETAILED DESCRIPTION OF THE PREFERRED EMBODIMENTS

Figure 1:
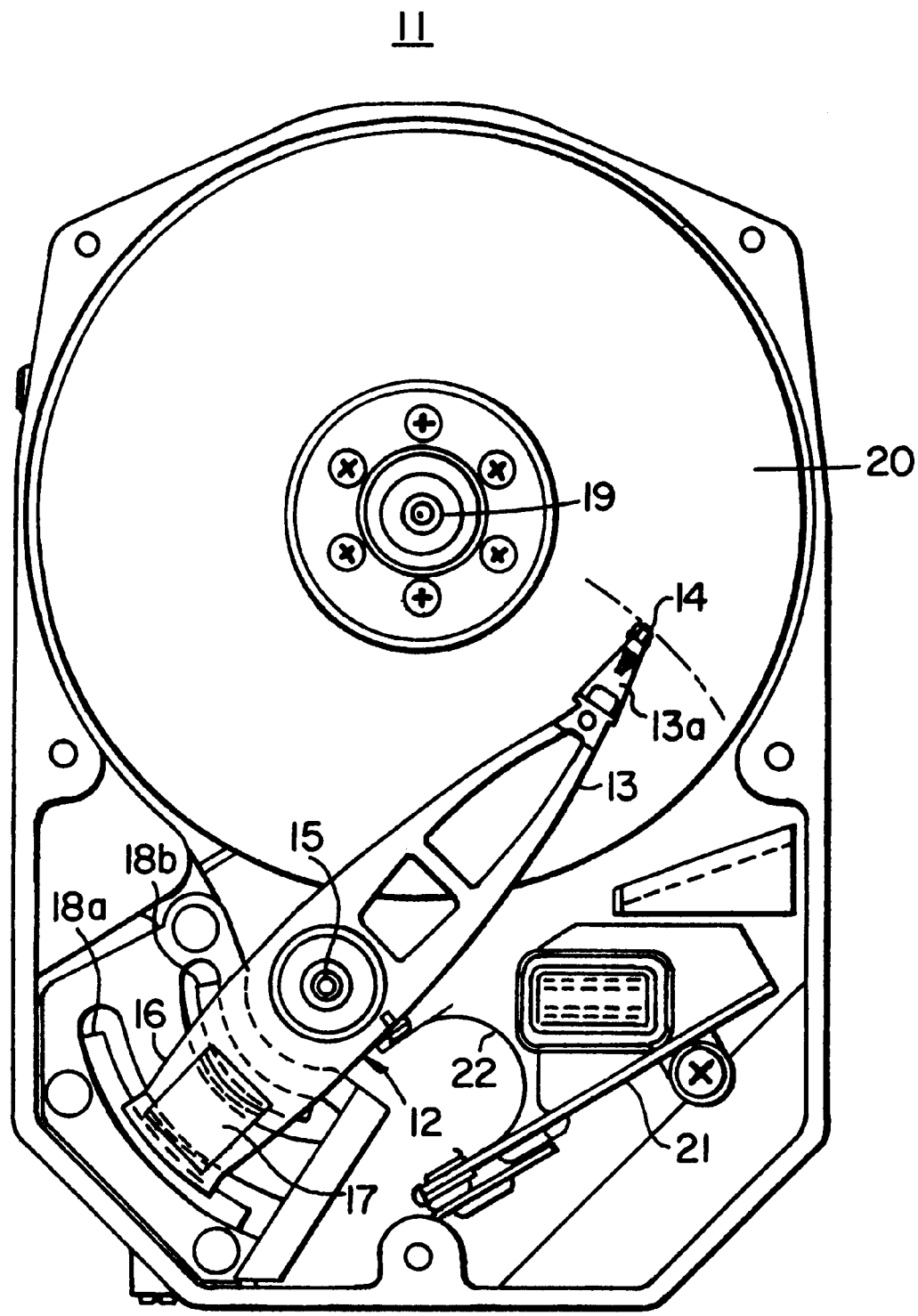
FIG. 1 shows a plan view of a magnetic disk device in the related art.
Figure 2A:
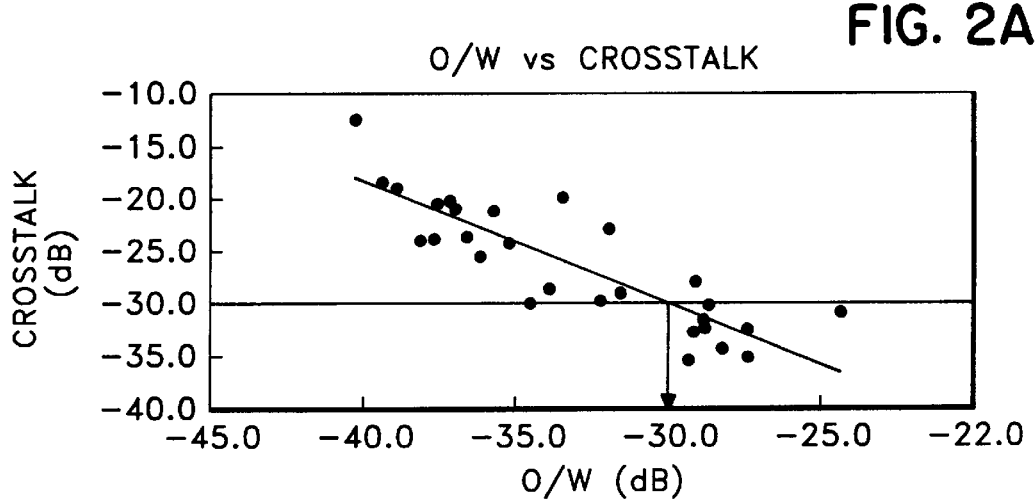
FIGS. 2A, 2B and 2C illustrate various characteristics of the magnetic disk device.
Figure 2B:
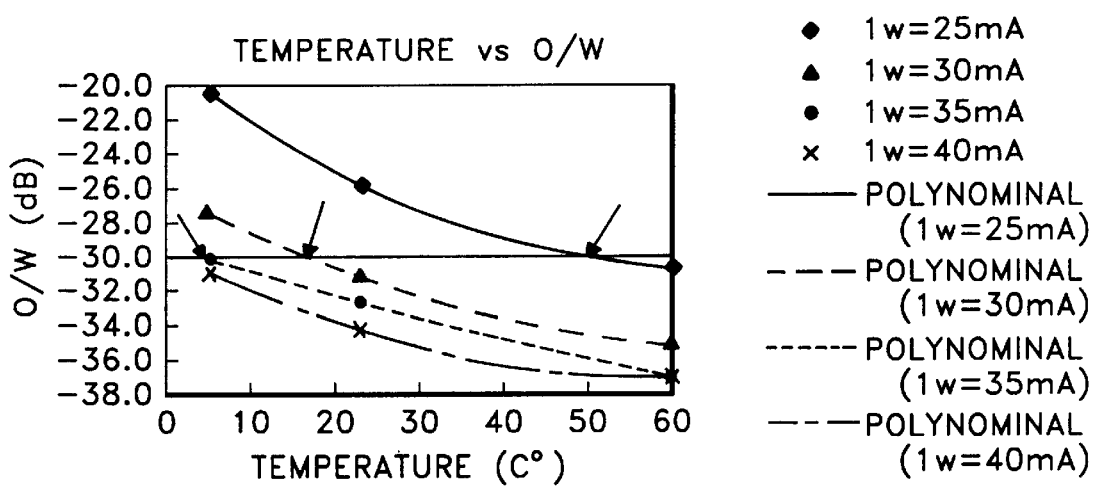
Figure 2C:
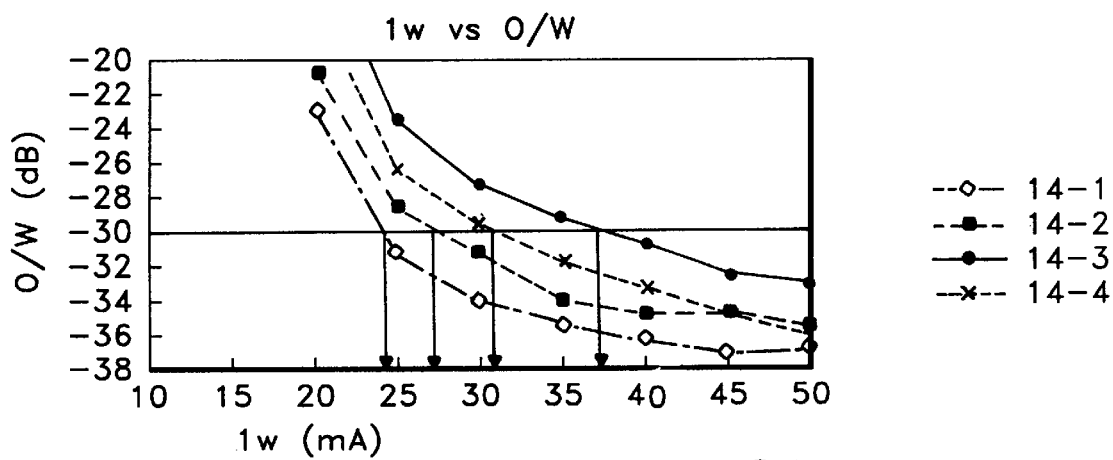
Figure 3:
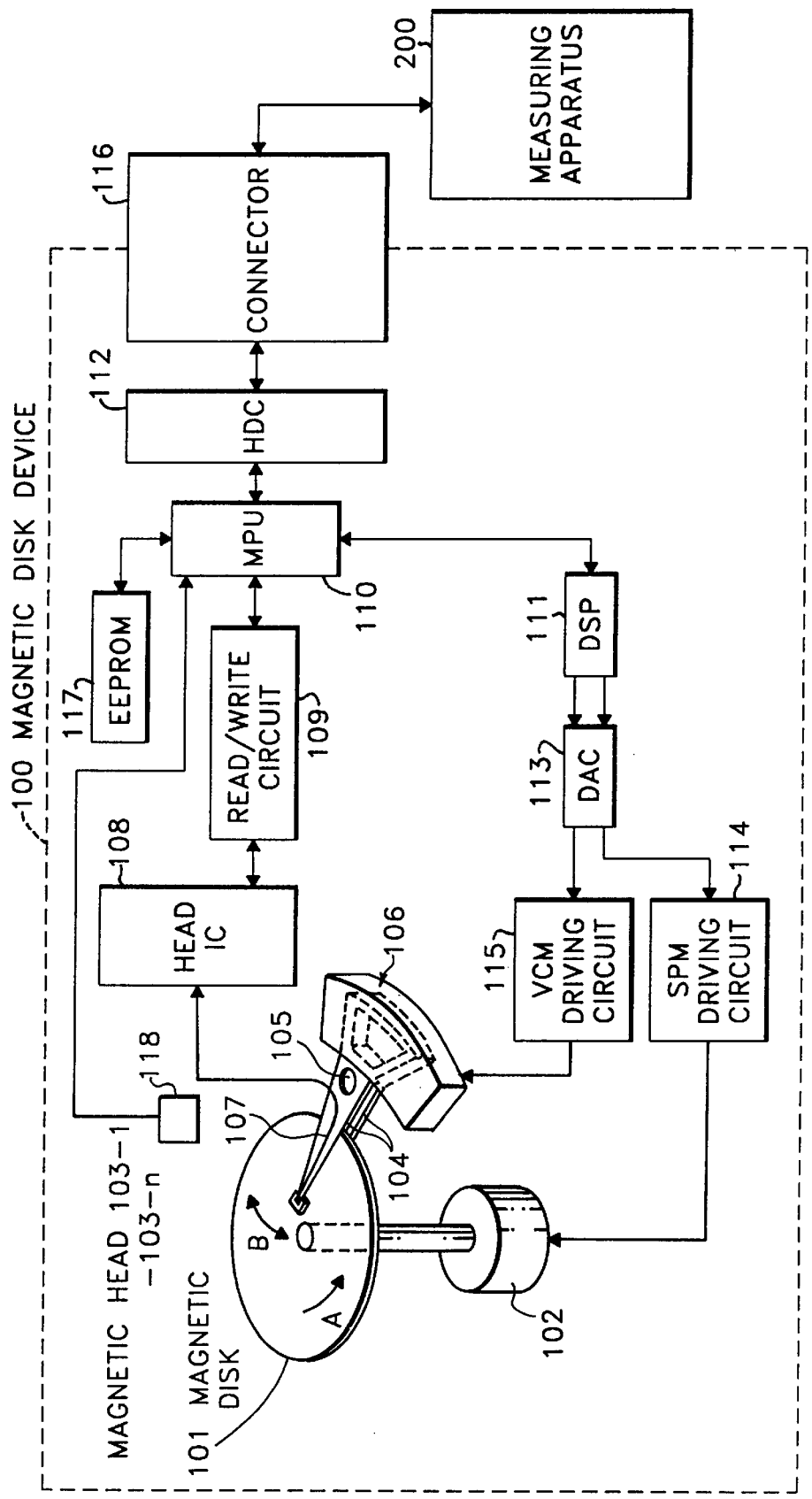
FIG. 3 shows a block diagram of first and second embodiments of the present invention.

FIG. 3 shows a block diagram of a first embodiment of the present invention.

For the first embodiment, a case where the write current of a magnetic disk device 100 is set will be described. The magnetic disk device 100 in which the write current will be set is connected to a measuring apparatus 200.

In the magnetic disk device 100, information is magnetically recorded on a magnetic disk 101. The magnetic disk 101 is rotated by a spindle motor 102 in the arrow A direction.

A magnetic head 103 is positioned to face a surface of the magnetic disk 101. The magnetic head 103 magnetically affects and records information on the magnetic disk 101. Further, the magnetic head 103 reads information recorded on the magnetic disk 101. The magnetic head 103 is fixed to an arm 104. The magnetic head 103 slightly floats apart from the surface of the magnetic disk 101 due to the rotation of the magnetic disk 101. In this condition, the magnetic head 103 records information on the magnetic disk 101 and reproduces information from the magnetic disk 101.

The arm 104 is supported by a rotation shaft 105 in a manner in which the arm 104 can rotate about the rotation shaft 105. The arm 104 has the magnetic head 103 supported thereto at the extending end thereof. A voice coil motor 106 is provided opposite to the arm 104 with respect to the rotation shaft 105. The voice coil motor rotates the arm 104 in the arrow B directions about the rotation shaft 105. Thus, the magnetic head 103 moves in a radial direction of the magnetic disk 101.

The magnetic head 103 is connected to a head IC (Integrated Circuit) 108 via a connection line 107. The head IC 108 amplifies the write current when information is recorded on the magnetic disk 101. The head IC 108 also amplifies the read current which occurs in the magnetic head 103 due to change of magnetic flux of the magnetic disk 101.

The head IC 108 is connected to an MPU (Micro Processing Unit) 110 via a read/write circuit 109. The read/write circuit 109 encodes data supplied from the MPU 110 into a recording signal and decodes the read current read through the magnetic head 103 into data which the MPU 110 can process.

The MPU 110 is connected to the read/write circuit 109, a DSP (Digital Signal Processor) 111, a HDC (Hard disk Drive Controller) 112, an EEPROM (Electrically Erasable and Programmable ROM) 117 and a temperature sensor 118. The MPU 110 refers to the EEPROM 117 in accordance with an internal temperature detected by the temperature sensor 118, and, using an optimum write current Iw set in the EEPROM 117 for each temperature, records information onto the magnetic disk 101 and reproduces information from the magnetic disk 101. Further, the MPU 110 controls the rotation of the magnetic disk 101 and positioning of the magnetic head 103 in accordance with information read from the magnetic disk 101 through the magnetic head 103.

The DSP 111 generates digital data, which controls the rotation of the spindle motor 102, in accordance with digital data, supplied from the MPU 110, which determines the rotation speed of the magnetic disk 101. Further, the DSP 111 generates digital data which controls the voice coil motor 106 in accordance with digital data, supplied from the MPU 110, which determines the position of the magnetic head 103.

The digital data, generated by the DSP 111, which controls the rotation of the spindle motor 102 and the digital data, generated by the DSP 111, which controls the rotation angle of the voice coil motor 106 are supplied to a DAC (Digital-to-Analog Converter) 113. The DAC 113 converts the digital data, supplied from the DSP 111, which controls the rotation of the spindle motor 102 and the digital data, supplied from the DSP 111, which controls the rotation angle of the voice coil motor 106, into analog signals, respectively.

The digital data supplied from the DSP 111 to the DAC 113 for controlling the rotation of the spindle motor 102 is supplied to a spindle motor driving circuit 114 after being converted into the analog signal in the DAC 113. In accordance with the analog signal supplied from the DAC 113, the spindle motor driving circuit 114 generates a driving signal which drives the spindle motor 102 and supplies the driving signal to the spindle motor. The spindle motor 102 is rotated by the driving signal supplied from the spindle motor driving circuit 114 and rotates the magnetic disk 101 in the arrow A direction at a fixed rotation speed.

The digital data supplied from the DSP 111 to the DAC 113 for controlling the rotation angle of the voice coil motor 106 is supplied to a voice coil motor driving circuit 115 after being converted into the analog signal in the DAC 113. In accordance with the analog signal supplied from the DAC 113, the voice coil motor driving circuit 115 generates a driving signal which drives the voice coil motor 106 and supplies the driving signal to the voice coil motor 106. The voice coil motor 106 is rotated by the driving signal supplied from the voice coil motor driving circuit 115, and rotates the magnetic head 103 in the arrow B directions, such that the rotation angle is controlled and the magnetic head 103 is positioned.

The HDC 112 is connected between the MPU 110 and an externally connecting connector 116. The HDC 112 controls data transmission and reception between the magnetic disk device 100 and external equipment connected to the connector 116.

When the magnetic disk device 100 performs information recording and reproducing, the connector 116 is connected with the external equipment. Thereby, data and various control signals are input and output. When the optimum write current Iw is determined, the measuring apparatus 200 is connected to the connector 116.

In the EEPROM 117, the optimum write current Iw, which is measured by the measuring apparatus 200 for each head for each temperature, is stored. In an ordinary operation, the EEPROM 117 is referred to in accordance with the internal temperature detected by the temperature sensor 118, as mentioned above, and the magnetic disk device 100 reads the optimum write current Iw in accordance with the detected temperature from the EEPROM 117 and sets the optimum write current Iw.

FIGS. 4A, 4B, 4C and 4D show data arrangements of the EEPROM 117.

As shown in FIG. 4A, in the EEPROM 117, the write currents Iw1 through Iwn of particular heads 103-1 through 103-n are stored for each temperature of the temperatures T1 through Tn. When the temperature detected by the temperature sensor 118 is within the range covered by the temperature T1, the MPU 110 sets the write currents Iw1 through Iwn of the heads 103-1 through 103-n to Iw1-1 through Iwn-1, respectively. When the temperature detected by the temperature sensor 118 is within the range covered by the temperature TL, the MPU 110 sets the write currents Iw1 through Iwn of the heads 103-1 through 103-n to Iw1-L through Iwn-L, respectively.

The measuring apparatus 200 sets the data contents stored in the EEPROM 117.

FIG. 5 shows a block diagram of the measuring apparatus in the first embodiment of the present invention.

The measuring apparatus 200 is provided with a connector 201 for connecting to the magnetic disk device 100. The connector 116 of the magnetic disk device 100 is connected to the connector 201 via a cable.

The connector 201 is connected to an interface 202. Other than the connector 201, a temperature sensor 203 which measures the temperature of the magnetic disk device 100, a temperature control device 204 which controls the temperature of the magnetic disk device 100, a keyboard 205 for inputting instructions of measurement or the like and a bus 206 are connected to the interface 202.

When the measuring apparatus 200 performs the operations shown in FIGS. 6, 7 or FIGS. 10, 11, the temperature sensor 203 is set in proximity to or in contact with the magnetic disk device 100. Further, at the same time, the temperature control device 204 is also set in proximity to or in contact with the magnetic disk device 100. The temperature control device 204 includes, for example, a heater for heating the magnetic disk device 100 and a fan for cooling the magnetic disk device 100.

The interface 202 transmits data to be output via the connector 201, receives data input via the connector 201, receives temperature data from the temperature sensor 203, transmits control data to the temperature control device 204, receives instructions via the keyboard, and controls input and output of various data from/to the bus 206.

A CPU (Central Processing Unit) 207 which performs data processing, a program memory 208 in which programs which are executed by the CPU 207 are stored, a RAM (Random Access Memory) 209 which provides a work area when the CPU 207 executes the programs stored in the program memory 208, a filing device 210 in which data processed by the CPU 207 is filed, and an indication processing portion 212 which processes data for indicating the data processed by the CPU 207 on a indicating device 211 are connected to the bus 206.

In the measuring apparatus 200, in response to the keyboard 205 being operated by a user, the programs stored in the program memory 208 are executed one by one. The optimum write currents, which are to be set in the magnetic disk device 100, as described later, are determined. The determined data is indicated on the indicating device 211 and is filed in the filing device 210. The optimum write currents determined in the measuring apparatus 200 are, as the optimum write currents for the respective temperatures of the magnetic disk device 100, supplied to the magnetic disk device 100 via the interface 202 and connector 201, and are stored in the EEPROM 117 of the magnetic disk device 100.

An optimum current measuring method by the measuring apparatus 200 will now be described.

Figure 6:
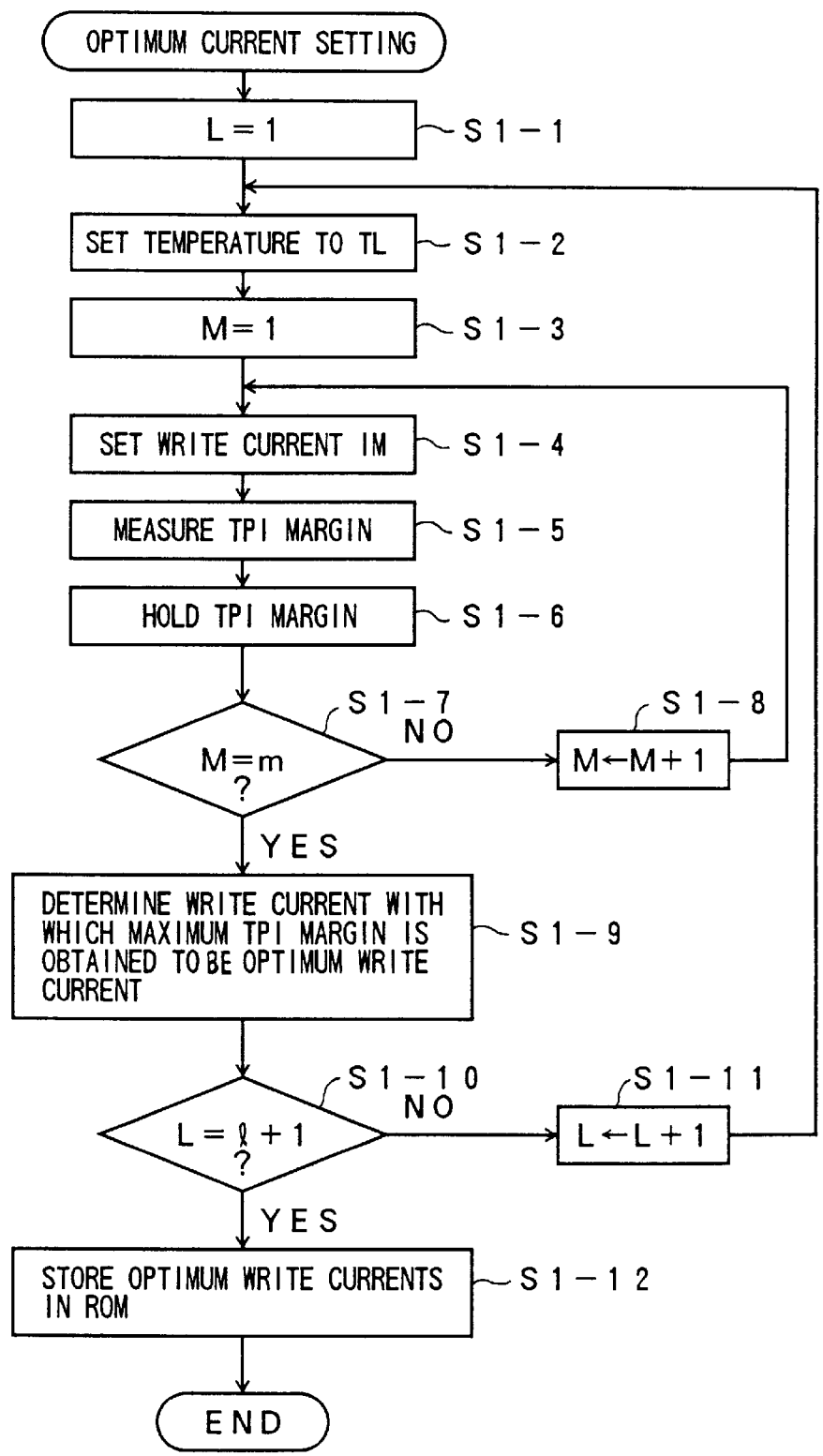
FIG. 6 shows an operation flowchart of optimum write current setting of the measuring apparatus in the first embodiment of the present invention.

FIG. 6 shows an operation flowchart when the measuring apparatus 200 in the first embodiment of the present invention determines the optimum currents.

First, the measuring apparatus 200 resets a variable L to '1' in a step S1-1. Then, the measuring apparatus 200 monitors the temperature detected by the temperature sensor 203, while controlling the temperature control device 204, and setting the temperature of the magnetic disk device 100 to TL in a step S1-2.

Then, the measuring apparatus 200 sets a variable M to '1'. The variable M is used for determining the number of changes of the write current in a step S1-3. In a step S1-4, the measuring apparatus 200 sets the write current IM in accordance with the variable M in the magnetic disk device 100.

For example, if the write current IM is determined by (1.0×M) mA, when the variable M=1, the write current IM=(1.0×1)=1.0 (mA) is set.

Then, in a step S1-5, the measuring apparatus 200 measures a TPI margin using the write current IM set in the step S1-4.

With reference to FIGS. 7, 8A, 8B and 8C, a TPI margin measuring method in the step S1-5 will now be described.

Figure 7:
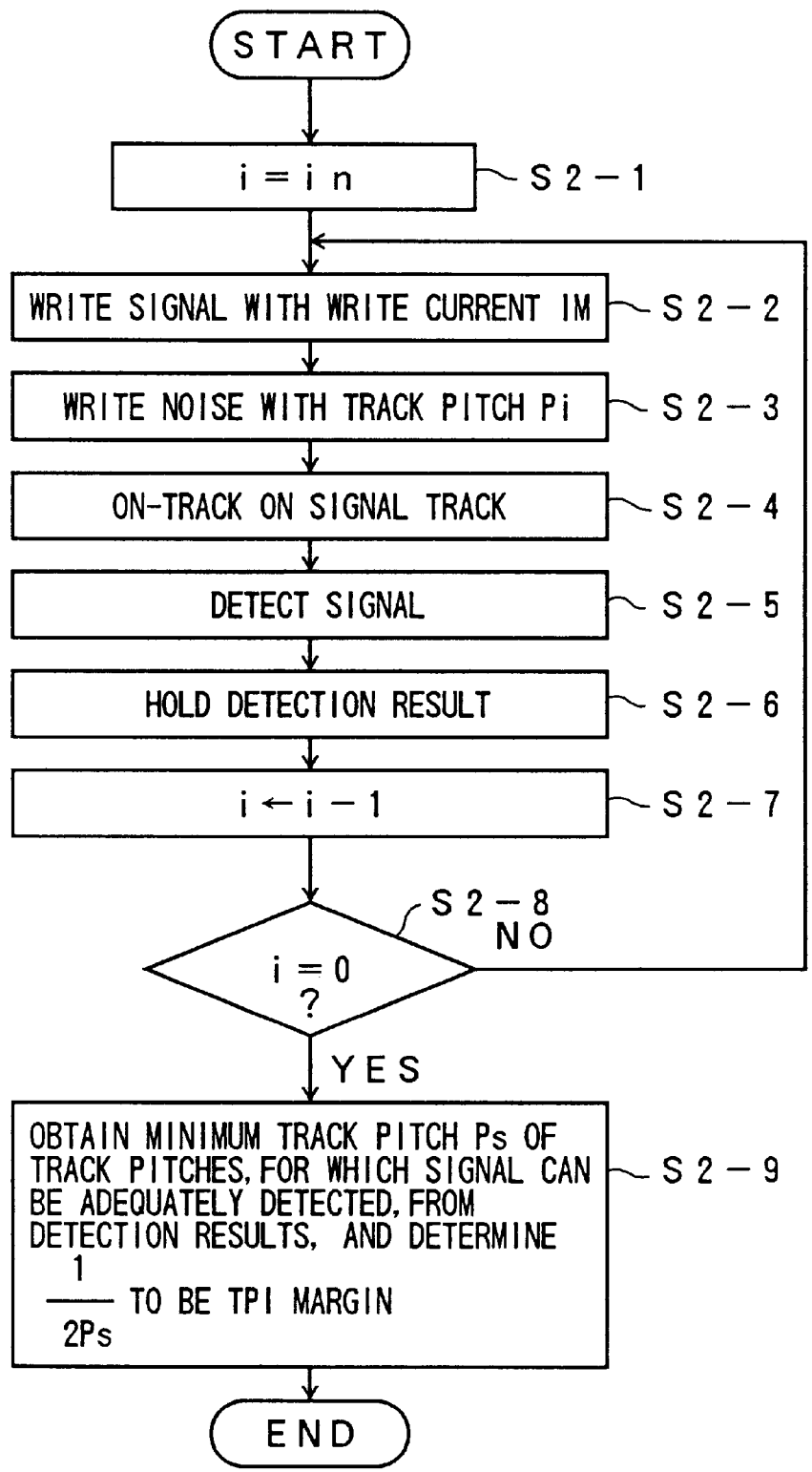
FIG. 7 shows an operation flowchart of TPI margin detection of the measuring apparatus in the first embodiment of the present invention.

FIG. 7 shows a flowchart of a TPI margin detecting operation of the measuring apparatus 200 in the first embodiment of the present invention. FIGS. 8A, 8B and 8C illustrate the TPI margin detecting operation. FIG. 8A shows a track writing operation, FIG. 8B shows a noise writing operation and FIG. 8C shows a signal reading operation.

The measuring apparatus 200 sets 'in' in a variable i for setting a pitch, in a step S2-1.

Then, the measuring apparatus 200 supplies instructions for the magnetic disk device 100 to write a predetermined signal on the magnetic disk with the write current IM, in a step S2-2.

In accordance with the instructions from the measuring apparatus 200, the magnetic disk device 100 writes on a track Tr0 as shown in FIG. 8A Then, the measuring apparatus 200 supplies instructions for the magnetic disk device 100 to write noise with the same write current IM with a pitch Pi from the track Tr0, in a step S2-3.

In accordance with the instructions from the measuring apparatus 200, the magnetic disk device 100 forms a noise track Tr1 with the same write current IM with the pitch Pi from the signal track Tr0, as shown in FIG. 8B Then, the measuring apparatus 200 supplies instructions for the magnetic disk device 100 to control the magnetic head to be in an on-track condition on the signal track Tr0 formed in accordance with the instructions of the step S2-2, and to read and demodulate the signal, in steps S2-4 and S2-5. (The on-track condition is a condition where the center of a magnetic head is coincident with the center of a track.)

In a step S2-6, the measuring apparatus 200 holds the signal of the signal track Tr0 detected in the step S2-5.

Then, the variable i for determining the track pitch is set to be i-1, in a step S2-7. As a result of the value set in the variable i being thus reduced, the noise track Tr1 in which the noise is written approaches the signal track Tr0 in which the signal is written.

The measuring apparatus repeats the abovementioned steps S2-2 through S2-8 until i=0. When i=0 in the step S2-8, the measuring apparatus 200 reads the detection results for the respective track pitches Pin through P0, and obtains the minimum track pitch Ps among the track pitches for which the signal can be adequately detected. From the track pitch Ps, 1/(2Ps) is determined as the TPI margin, in a step S2-9.

Thus, the TPI margin for the predetermined write current IM is obtained in the step S1-5.

With reference to FIG. 6, in a step S1-6, the TPI margin obtained in the step S1-5 is held.

Then, in a step S1-7, it is determined whether or not the variable M has reached a predetermined value m. When it is determined in the step S1-7 that the variable M has not reached the predetermined value m, 'M+1' is set in the variable M for setting the write current IM, in a step S1-8. Then, the operation returns to the step S1-4.

By setting 'M+1' in the variable M, the write current increases. The measuring apparatus 200 repeats the steps S1-4 through S1-8 until the variable M has reached the predetermined value m.

By repeating the steps S1-4 through S1-8, the measuring apparatus 200 obtains the TPI margins for different write currents I1 through Im, and holds the TPI margins.

When M has reached m in the step S1-7, the measuring apparatus 200 determines the write current, from among the write currents I1 through Im, with which the maximum TPI margin was obtained, as the optimum write current for the temperature TL and holds it, in S1-9.

FIG. 9 shows characteristics of the TPI margin with respect to the write currents Iw in the first embodiment of the present invention.

When the measuring apparatus 200 changes the write current IM while obtaining the TPI margins, the characteristics shown in FIG. 9 are obtained. In FIG. 9, the write current with which the maximum TPI margin is obtained is determined to be the optimum write current. For example, in the characteristics shown in FIG. 9, the optimum write current Iw is 39 (mA).

When the optimum write current Iw for the temperature TL is obtained in the step S1-9, then, the measuring apparatus 200 determines in a step S1-10 whether or not the variable L for setting the temperature TL has reached Λ. When it is determined in the step S1-10 that the variable L has not reached Λ, the measuring apparatus 200 sets 'L+1' in the variable L, in a step S1-11. Then the operation returns to the step S1-2.

As a result of 'L+1' being set in the variable L, the setting value of the temperature TL rises.

The measuring apparatus 200 repeats the steps S1-2 through S1-11 until it is determined in the step S1-10 that the variable L has reached Λ. Thus, the measuring apparatus 200 obtains the optimum write currents for the respective setting temperatures T1 through TΛ. When the setting temperature changes, the peak of the TPI margin moves in a direction C1 or in a direction C2 shown in FIG. 9 As a result, the optimum write current Iw changes.

When it is determined in the step S1-10 that the variable L has reached Λ, the measuring apparatus 200 supplies the optimum current Iw for each setting temperature stored in the filing device 210 to the magnetic disk device 100. The supplied the optimum current Iw for each setting temperature is stored in the EEPROM 117, in a step S1-12.

The measuring apparatus 200 performs the operations of the above-mentioned steps S1-1 through S1-12 for each of the plurality of magnetic heads 103-1 through 103-n.

Thus, as shown in FIG. 4A, in the EEPROM 117, the optimum write currents for the particular magnetic heads 103-1 through 103-n for the respective setting temperatures T1 through TΛ are stored.

It is also possible that the EEPROM 117 stores not the optimum write currents themselves but write current indicating values. In this case, a RAM (Random Access Memory) is connected to the MPU 110 and the optimum current values are managed in the RAM.

As the write current indicating values, amounts of write current change for changing reference write currents of the magnetic heads 103-1 through 103-n, respectively, can be considered.

For example, as shown in FIG. 4B, a reference write current table Ta1 is provided for storing the reference write currents IS1 through ISn of the respective magnetic heads 103-1 through 103-n. Further, as shown in FIG. 4C, a correcting amount table Ta2 is provided for storing, for the respective magnetic heads 103-1 through 103-n, correcting amounts ΔI1-1 through ΔIn-Λ from the reference write currents IS1 through ISn for the temperatures T1 through T2. Then, when power is supplied or the temperature changes so that it is necessary to update the write currents, the reference write currents IS1 through ISn are read from the reference write current table Ta1. Further, when the current temperature detected by the temperature sensor 118 is TL, the correcting amounts ΔI1-L through ΔIn-L are read from the correcting amount table Ta2 for the detected temperature TL. Then, the correcting amounts ΔI1-L through ΔIn-L are added to the reference write currents IS1 through ISn, respectively. Thus, the optimum write currents Iw1-L through Iwn-L of the magnetic heads 103-1 through 103-n are obtained for the temperature TL. As shown in FIG. 4D, an optimum write current table Ta3 is provided for storing the thus-obtained optimum write currents Iw1-L through Iwn-L for the magnetic heads 103-1 through 103-n.

The above-described operations of setting the optimum write currents for each temperature in the EEPROM 117 are performed for each of all magnetic disk devices when they are shipped. Alternatively, it is also possible that predetermined magnetic disk devices are sampled, and the above-described operations of setting the optimum write currents for each temperature in the EEPROM 117 are performed for each of the sampled magnetic disk devices. Then, the setting results for the sampled magnetic disk devices are applied to the magnetic disk devices which approximate the sampled magnetic disk devices, respectively.

Further, it is possible that a temperature control device is provided in the magnetic disk device, and the MPU 110 performs the operations of the above-described steps S1-1 through S1-12 in FIG. 6 Thereby, it is possible to update setting of the optimum write currents in the EEPROM 117, by performing the operations of FIG. 6, periodically after the magnetic disk device is shipped.

In the first embodiment, the optimum write currents of the respective magnetic heads are set for the current temperature, when information recording or reproducing is performed in the magnetic disk device. Accordingly, even when changes in environmental conditions cause changes in the characteristics of the magnetic heads and magnetic disks, the optimum writing currents are provided. As a result, stable data demodulation can always be performed, and quality improvement in the demodulated data can be achieved.

Further, in the first embodiment, automatically, necessary and minimum optimum write currents can be obtained for the respective magnetic heads and magnetic disks, for the respective cylinder positions. The setting of the optimum write currents can be easily performed. When higher density information recording is performed, the optimum write current can be easily set.

Further, in the first embodiment, because a demodulation margin, such as the TPI margin, is used for determining the optimum write currents, determination of the optimum write currents can be easily performed merely by connecting the measuring apparatus 200 to the magnetic disk device 100 after the magnetic disk device 100 is assembled.

Further, in the first embodiment, the TPI margin is used for evaluating the write currents. However, it is not necessary to be limited to the TPI margin. Another demodulation margin such as a viterbi margin, a phase margin or the like can be used. In this case, in the flowchart shown in FIG. 6, instead of the TPI margin, another demodulation margin such as a viterbi margin, a phase margin or the like is measured.

A method of setting the optimum write currents using a combination of the TPI margin and the viterbi margin will can be considered.

Figure 10:
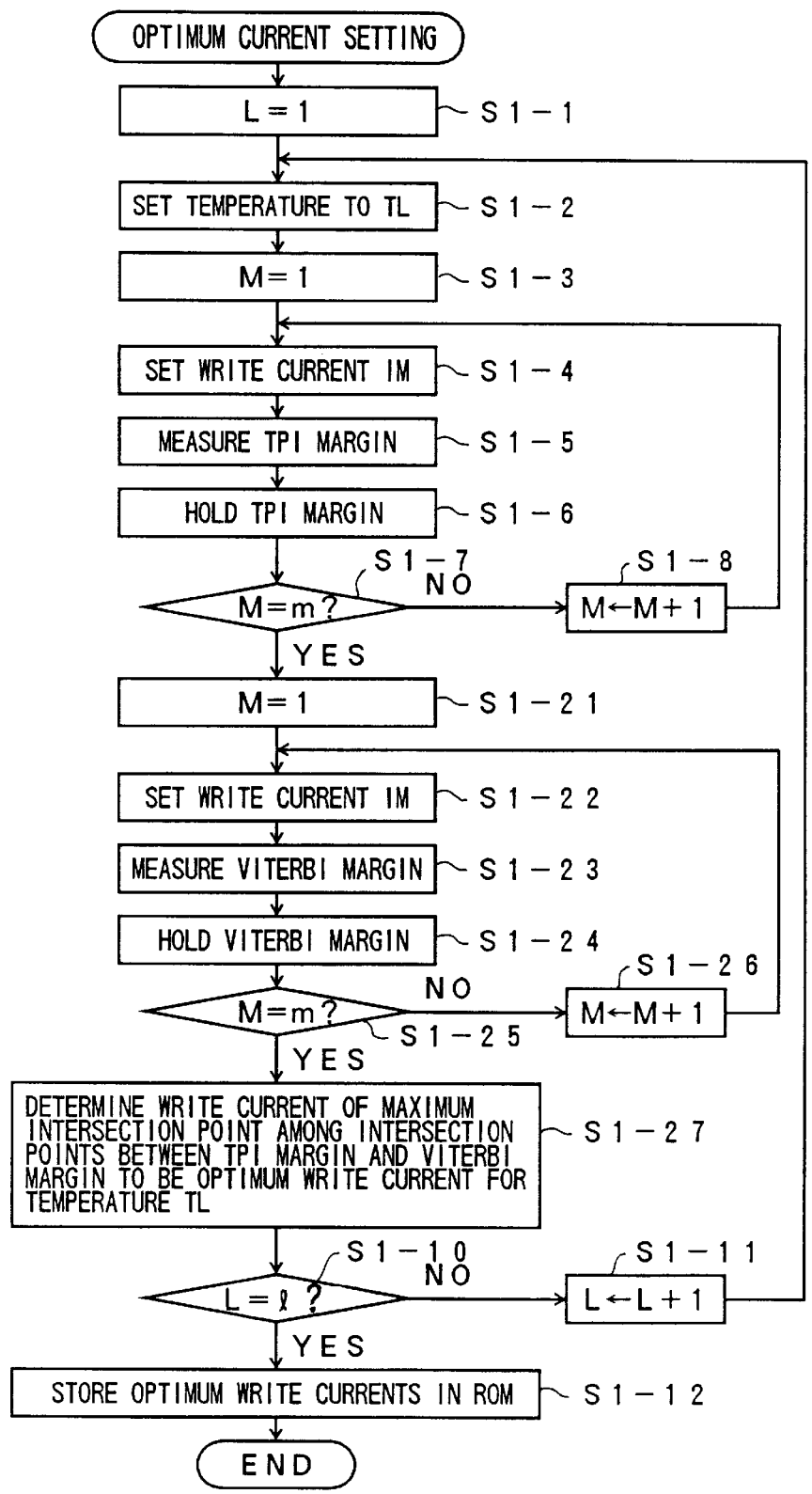
FIG. 10 shows an operation flowchart of optimum write current setting of the measuring apparatus in the second embodiment of the present invention.

FIG. 10 shows an operation flowchart of optimum write current setting by a measuring apparatus in a second embodiment of the present invention. In the figure, the same step numbers are given to the steps the same as those shown in FIG. 6, and the descriptions thereof will be omitted. The arrangements of the magnetic disk device 100 and the measuring apparatus 200 are the same as those of FIGS. 3, 4A–4D and 5, and the descriptions thereof will be omitted.

In the optimum write current setting method in the second embodiment, the TPI margin and the viterbi margin are used as the demodulation margins, and the write current with which both the TPI margin and the viterbi margin are optimum is set as the optimum write current.

After the TPI margins for the m write currents are measured and held in a method similar to the method in the steps S1-4 through S1-8 of FIG. 6 (Yes in the step S1-7), the viterbi margins are measured in the second embodiment.

First, the measuring apparatus 200 sets a variable M to '1'. The variable M is used for determining the number of changes of the write current, in a step S1-21. In a step S1-22, the measuring apparatus 200 sets the write current IM in accordance with the variable M in the magnetic disk device 100.

For example, if the write current IM is determined by (1.0×M) mA, when the variable M=1, the write current IM=(1.0×1)=1.0 (mA) is set.

Then, in a step S1-23, the measuring apparatus 200 measures the viterbi margin using the write current IM set in the step S1-22.

With reference to the following figures, the viterbi margin measuring method in the step S1-23 will now be described.

Figure 11:
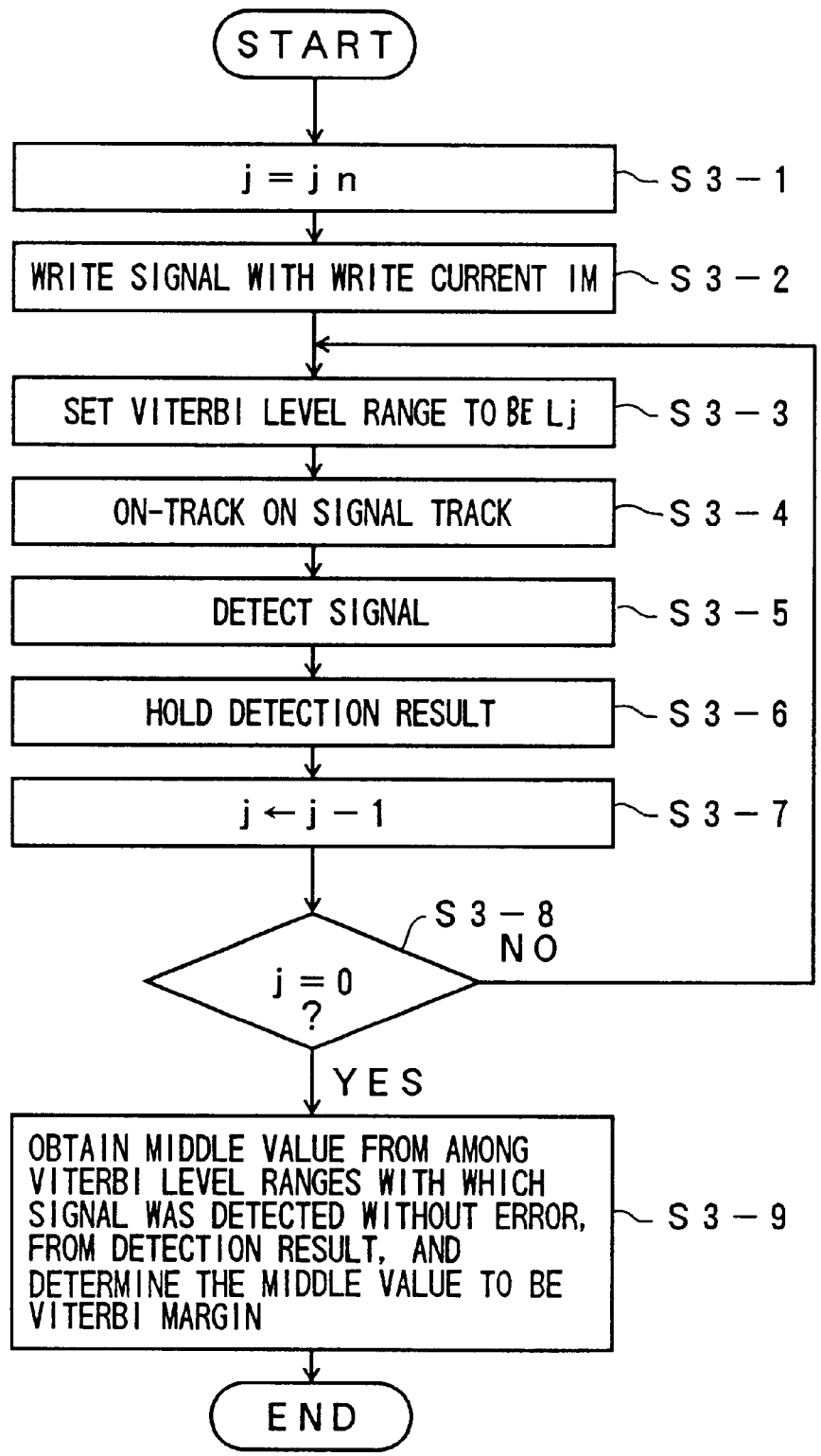
FIG. 11 shows an operation flowchart of viterbi margin detection of the measuring apparatus in the second embodiment of the present invention.

FIG. 11 shows a flowchart of a viterbi margin detecting operation of the measuring apparatus in the second embodiment of the present invention. FIGS. 12A, 12B, 12C, 12D, 12E, 13A, 13B, 13C and 13D illustrate the viterbi margin detecting operation of the measuring apparatus in the second embodiment of the present invention. FIGS. 12A, 12B, 12C, 12D and 12E show a case where a viterbi level range is large. FIGS. 13A, 13B, 13C and 13D show a case where the viterbi level range is small. FIG. 12A shows writing information, FIGS. 12B and 13A show a writing signal and a read signal, and FIGS. 12C and 13B show demodulated information.

First, the measuring apparatus 200 sets an initial value jn in a variable j for setting the viterbi level range, in a step S3-1.

Then, the measuring apparatus 200 supplies instructions for the magnetic disk device 100 to write a predetermined signal with the write current IM, in a step S3-2.

In accordance with the instructions from the measuring apparatus 200, the magnetic disk device 100 writes the signal on the magnetic disk.

Then, the measuring apparatus 200 supplies instructions for the magnetic disk device 100 to set the viterbi level range in reproduction to be Lj, in a step S3-3.

In accordance with the instructions from the measuring apparatus 200, the magnetic disk device 100 sets the viterbi level range in reproduction to be Lj.

Then, the measuring apparatus 200 supplies instructions for the magnetic disk device 100 to control the magnetic head to be in an on-track condition on the signal track written in accordance with the instructions of the step S3-2 and to demodulate the signal, in steps S3-4. In a step S3-5, the magnetic disk device 100 reads and demodulates the signal written in the step S3-2 with the viterbi level range set in the step S3-3.

In a step S3-6, the measuring apparatus 200 holds the signal inside the result of signal detection in the step S3-5.

Then, the variable j for determining the viterbi level range is set to be j-1, in a step S3-7.

As a result of the value set in the variable j being thus reduced, the viterbi level range is reduced.

With reference to FIGS. 12A, 12B, 12C, 12D and 12E, operations in the case where the viterbi level range Lj is large will now be described.

In FIG. 12B, the solid line represents the writing signal waveform, the broken line represents the reproduced signal waveform, and the black circles '●' represent sampling positions. The hatched portions represent the viterbi level range Lj.

The writing data shown in FIG. 12A is written on the magnetic disk 101 using the writing signal represented by the solid line shown in FIG. 12B When the information, written on the magnetic disk 101 using the writing signal represented by the solid line shown in FIG. 12B, is reproduced, the reproduced signal represented by the broken line shown in FIG. 12B is obtained.

At this time, when signal detection is performed with the viterbi level range Lj indicated as the hatched portions in FIG. 12B, the relationship of the signal between adjacent sampling positions is the relationship indicated by the arrows shown in FIG. 12C. The arrows shown in FIG. 12C are coded into the values shown in FIG. 12D. FIG. 12D shows the result obtained in a condition without detection error.

When the viterbi level range Lj is widened and thus, for example, the sampled point SP1 at the sampling time t1, shown in FIG. 12B, is positioned within the viterbi level range Lj, signal detection is performed so that the level of the sampled point SP1 at the sampling time t1 is equal to the level of the sampled point SP0 at the sampling time t0. Thereby, as shown in FIG. 12E, the coded value between the times t0 and t1 is '0'. This value is different from the corresponding coded value '1' shown in FIG. 12D Thus, an error occurs. Similarly, when the viterbi level range Lj is widened and thus, for example, the sampled point SP2 at the sampling time t2, shown in FIG. 12B, is positioned within the viterbi level range Lj, signal detection is performed so that the level of the sampled point SP2 at the sampling time t2 is equal to the level of the sampled point SP1 at the sampling time t1. Thereby, as shown in FIG. 12E, the coded value between the times t1 and t2 is '0'. This value is different from the corresponding coded value '1' shown in FIG. 12D. Thus, an error occurs.

With reference to FIGS. 13A, 13B, 13C and 13D, operations in the case where the viterbi level range Lj is small will now be described.

In FIG. 13A, the solid line represents the writing signal waveform, the broken line represents the reproduced signal waveform, and the black circles '●' represent sampling positions. The hatched portions represent the viterbi level range Lj.

The writing data shown in FIG. 12A is written on the magnetic disk 101 using the writing signal represented by the solid line shown in FIG. 13A. When the information, written on the magnetic disk 101 using the writing signal represented by the solid line shown in FIG. 13A, is reproduced, the reproduced signal represented by the broken line shown in FIG. 13A is obtained.

At this time, when signal detection is performed with the viterbi level range Lj indicated as the hatched portions in FIG. 13A, the relationship of the signal between adjacent sampling positions is the relationship indicated by the arrows shown in FIG. 13B. The arrows shown in FIG. 13B are coded into the values shown in FIG. 13C. FIG. 13C shows the result obtained in a condition without detection error.

When the viterbi level range Lj is narrowed and thus, for example, the sampled point SP11 at the sampling time t11, shown in FIG. 13A, is positioned outside of the viterbi level range Lj, signal detection is performed so that the level of the sampled point SP11 at the sampling time t11 is different from the level of the sampled point SP10 at the sampling time t10. Thereby, as shown in FIG. 13D, the coded value between the times t10 and t11 is '1'. This value is different from the corresponding coded value '0' shown in FIG. 13C. Thus, an error occurs. Similarly, when the viterbi level range Lj is narrowed and thus, for example, the sampled point SP12 at the sampling time t12, shown in FIG. 13A, is positioned outside of the viterbi level range Lj, signal detection is performed so that the level of the sampled point SP12 at the sampling time t12 is different from the level of the sampled point SP11 at the sampling time t11. Thereby, as shown in FIG. 13D, the coded value between the times t11 and t12 is '1'. This value is different from the corresponding coded value '0' shown in FIG. 13C. Thus, an error occurs. Thus, errors of the coded values are found, and it is determined whether or not signal detection can be performed without errors of the coded values. Thus, the viterbi level ranges with which the signal can be detected without errors are detected, in a step S3-9.

The steps S3-3 through S3-7 are repeated until the variable j becomes '0'.

When it is determined in the step S3-8 that the variable j is '0', the measuring apparatus 200 has held the detection results for the viterbi level ranges Lj of 'L1' through 'Ljn' for the variables j of '1' through 'jn'.

The measuring apparatus 200 obtains the viterbi level ranges with which the signal could be detected without errors, from the detection results, and determines the middle value, from among the obtained viterbi level ranges, to be the viterbi margin, in step S3-9.

Thus, the viterbi margin measuring operation in the step S1-23 shown in FIG. 10 is performed. By the viterbi margin measuring operation, the viterbi margin for the predetermined write current IM is obtained.

Then, in a step S1-24, the measuring apparatus 200 holds the viterbi margin obtained in the step S1-23.

Then, in a step S1-25, it is determined whether or not the variable M has reached a predetermined value m. When it is determined in the step S1-25 that the variable M has not reached the predetermined value m, 'M+1' is set in the variable M for setting the write current IM, in a step S1-26. Then, the operation returns to the step S1-22.

By setting 'M+1' in the variable M, the write current increases. The measuring apparatus 200 repeats the steps S1-22 through S1-26 until the variable M has reached the predetermined value m.

By repeating the steps S1-22 through S1-26, the measuring apparatus 200 obtains the viterbi margins for different write currents I1 through Im, and holds the viterbi margins.

When M has reached m in the step S1-25, the measuring apparatus 200 determines the optimum write current for the temperature TL, from among the write currents I1 through Im, from the TPI margins obtained in the steps S1-3 through S1-8 and the viterbi margins obtained in the steps S1-21 through S1-26, in S1-27.

How to determine the optimum write current in the step S1-27 will now be described. The curve of the TPI margins with respect to the write currents and the curve of the viterbi margins with respect to the write currents are drawn. Then, from among the intersection points between these curves, the maximum one is selected. The write current of the selected intersection point is determined to be the optimum write current.

FIG. 14 show the characteristics of the TPI margins and viterbi margins with respect to the write currents in the second embodiment of the present invention. In the figure, the solid line and the black circles '●' represent the characteristics of the TPI margins, and the broken line and the white circles '603' represent the characteristics of the viterbi margins.

For example, the characteristics of the TPI margins, represented by the solid line and the black circles '●' in FIG. 14, are obtained by the steps S1-3 through S1-8, and the characteristics of the viterbi margins, represented by the broken line and the white circles 'O' in FIG. 14, are obtained by the steps S1-21 through S1-26.

As shown in FIG. 14, there are three intersection points, a1, a2 and a3, between the curve of the characteristics of the TPI margins and the curve of the characteristics of the viterbi margins. Among the three intersection points, the intersection point a3, at which the margins are maximum, is selected. The write current of the intersection point a3 is determined to be the optimum write current. Thus, as shown in the figure, the optimum write current is 40 mA. The write current 40 mA is set and held as the optimum write current.

When the optimum write current Iw for the temperature TL is obtained in the step S1-27, then, the measuring apparatus 200 determines in a step S1-10 whether or not the variable L for setting the temperature TL has reached Λ. When it is determined in the step S1-10 that the variable L has not reached Λ, the measuring apparatus 200 sets 'L+1' in the variable L, in a step S1-11. Then the operation returns to the step S1-2.

As a result of 'L+1' being set in the variable L, the setting value of the temperature TL rises.

The measuring apparatus 200 repeats the steps S1-2 through S1-8, S1-21 through S1-27, and S1-10, S1-11, until it is determined in the step S1-10 that the variable L has reached Λ. Thus, the measuring apparatus 200 obtains the optimum write currents for the respective setting temperatures T1 through TΛ. When the setting temperature changes, the maximum intersection point moves in a direction D1 or in a direction D2 shown in FIG. 14. As a result, the optimum write current Iw changes.

When it is determined in the step S1-10 that the variable L has reached Λ, the measuring apparatus 200 supplies the optimum current Iw for each setting temperature stored in the filing device 210 to the magnetic disk device 100. The supplied optimum current Iw for each setting temperature is stored in the EEPROM 117, in a step S1-12.

The measuring apparatus 200 performs the operations of the above-mentioned steps S1-2 through S1-8, S1-21 through S1-27, and S1-10 through S1-12 for each of the plurality of magnetic heads 103-1 through 103-n.

Thus, as shown in FIG. 4A, in the EEPROM 117, the optimum write currents for the particular magnetic heads 103-1 through 103-n for the respective setting temperatures T1 through TΛ (such as 0° through 60° as mentioned above in the summary of the invention) are stored.

In the second embodiment, the optimum write current with which both the TPI margin and the viterbi margin are optimum is obtained for each particular magnetic head for each temperature. Accordingly, even if high-density recording is performed, even if environmental conditions change, information recording and reproducing can be always surely performed.

In the second embodiment, the combination of the TPI margin and the viterbi margin is used for determining the optimum write current. However, it is not necessary to be limited to the combination of the TPI margin and the viterbi margin. A combination of other demodulation margins such as a phase margin, offset margin and so forth can be used for determining the optimum write current.

Further, in the second embodiment, the measuring apparatus 200 is separated from the magnetic disk device 100. However, it is also possible that a temperature control device is provided inside the magnetic disk device and the MPU 110 programs of the steps S1-1 through S1-8, S1-21 through S1-27, and S1-10 through S1-12 shown in FIG. 10. Thereby, the optimum write currents can be set inside the magnetic disk device 100. As a result, not only at the time of shipment of the magnetic disk device, but also at the time of power supply start, at the time of environmental condition change, or the like, the optimum write currents for the respective temperatures stored in the EEPROM 117 can be updated by performing the operations shown in FIG. 10. Accordingly, even when the characteristics of the magnetic disk device 100 change due to time elapsing, the optimum write currents can be set. Thus, information recording and reproducing can always be performed in the optimum conditions.

Further, in the first and second embodiments, the magnetic disk devices are described. However, the optimum write current setting methods in the first and second embodiments can also be applied to other information storing devices such as an optical disk device, a magneto-optical disk device and so forth, in which the optimum write current changes due to change of the temperature.

Further, the present invention is not limited to the above-described embodiments, and variations and modifications may be made without departing from the scope of the present invention.

What is claimed is:

1. A write current setting method for setting an optimum write current which is supplied to each of a plurality of recording heads when said each recording head is used for recording information onto a recording medium, said method comprising the steps of:

a) setting an ambient temperature;

b) setting a plurality of write currents in said ambient temperature set in said step a);

c) writing a signal onto said recording medium with each of said plurality of write currents set in said step b) and detecting a demodulation margin for each of said plurality of write currents by reading and demodulating the signal from the recording medium;

d) determining an optimum write current from said plurality of write currents for said ambient temperature based on the demodulation margins detected in said step c) for the respective write currents; and e) performing said steps a), b), c) and d) for a plurality of ambient temperatures, and obtaining an optimum write current for each of said plurality of ambient temperature, wherein said writing of the signal onto the recording medium and said detecting of the demodulation margin from the recording medium are performed by using each recording head of said plurality of recording heads, and said optimum write current is obtained with respect to each recording head of said plurality of recording heads.

2. The write current setting method according to claim 1, wherein the demodulation margin detected in said step c) comprises a recording density margin based on information recording densities.

3. The write current setting method according to claim 1, wherein the demodulation margin detected in said step c) comprises a viterbi margin based on viterbi demodulation level ranges.

4. The write current setting method according to claim 1, wherein:

said step c) detects a plurality of kinds of demodulation margins; and said step d) determines the optimum write current based on said plurality of kinds of demodulation margins.

5. A write current setting apparatus connected to an information storing device which comprises a plurality of recording heads for recording information onto a recording medium, temperature detecting means for detecting a temperature of said device, and write current changing means for changing a write current to be supplied to said each recording head in accordance with change of the temperature detected by said temperature detecting means, comprising:

temperature setting means for setting an ambient temperature of said device;

write current setting means for setting a plurality of write currents in said ambient temperature set by said temperature setting means;

demodulation margin detecting means for writing a signal onto said recording medium with each of said plurality of write currents set by said write current setting means, and for detecting a demodulation margin for each of said plurality of write currents by reading and demodulating the signal from the recording medium;

optimum write current determining means for determining an optimum write current from said plurality of write currents for said ambient temperature based on the demodulation margins detected by said demodulation margin detecting means for the respective write currents; and optimum write current setting means for obtaining an optimum write current for each of said plurality of ambient temperatures, wherein said demodulation margin detecting means performs said writing of the signal onto the recording medium and said detecting of the demodulation margin from the recording medium by using each recording head of said plurality of recording heads, and said optimum write current is obtained by said optimum write current setting means with respect to each recording head of said plurality of recording heads.

6. The write current setting apparatus according to claim 5, wherein the demodulation margin detected by said demodulation margin detecting means comprises a recording density margin based on information recording densities.

7. The write current setting apparatus according to claim 5, wherein the demodulation margin detected by said demodulation margin detecting means comprises a viterbi margin based on viterbi demodulation level ranges.

8. The write current setting apparatus according to claim 5, wherein, in said information storing device, the recording track density is equal to or more than 5000 TPI (Track Per Inch).

9. The write current setting apparatus according to claim 5, wherein:

said demodulation margin detecting means detects a plurality of kinds of demodulation margins; and said optimum write current determining means determines the optimum write current based on said plurality of kinds of demodulation margins.

10. An information storing device comprising a plurality of recording heads for recording information onto a recording medium, temperature detecting means for detecting temperature of said device, and write current changing means for changing a write current to be supplied to each said recording head in accordance with change of the temperature detected by said temperature detecting means, said write current changing means comprising:

a memory for storing a plurality of optimum write currents to be supplied to the plurality of recording heads for each of a plurality of temperatures of said device, each of the optimum write currents being obtained as a result of setting the plurality of temperatures of said device, setting a plurality of write currents for each of said plurality of temperatures, writing a signal onto said recording medium with each of said plurality of write currents, detecting a demodulation margin for each of said plurality of write currents by reading and demodulating the signal from the recording medium, determining said each optimum write current from among said plurality of write currents, for each of said plurality of temperatures, based on the demodulation margins detected for the respective write currents, respectively; and recording control means for referring to said memory using the temperature detected by said temperature detecting means, reading one of the plurality of optimum write currents for the detected temperature from said memory and supplying the read optimum write current to a corresponding one of the plurality of recording heads.

11. The information storing device according to claim 10, wherein the optimum write currents stored in said memory are determined based on recording density margins, as the demodulation margins, based on information recording densities.

12. The information storing device according to claim 10, wherein the optimum write currents stored in said memory are determined based on viterbi margins, as the demodulation margins, based on viterbi demodulation level ranges.

13. The information storing device according to claim 10, wherein the optimum write currents stored in said memory are determined based a plurality of kinds of demodulation margins.

14. The information storing device according to claim 10, wherein the recording track density on the information storing device is equal to or more than 5000 TPI (Track Per Inch).

15. The information storing device according to claim 10, wherein said recording control means changes discretely the optimum write current within a predetermined temperature range.

16. The information storing device according to claim 15, wherein said predetermined temperature range is from a temperature of 0° through 60°.

17. The information storing device according to claim 10, further comprising write current updating means for updating the optimum write current in said memory at a desired time and in accordance with the temperature detected by said temperature detecting means.

* * * * *